UNITED STATES PATENT OFFICE.

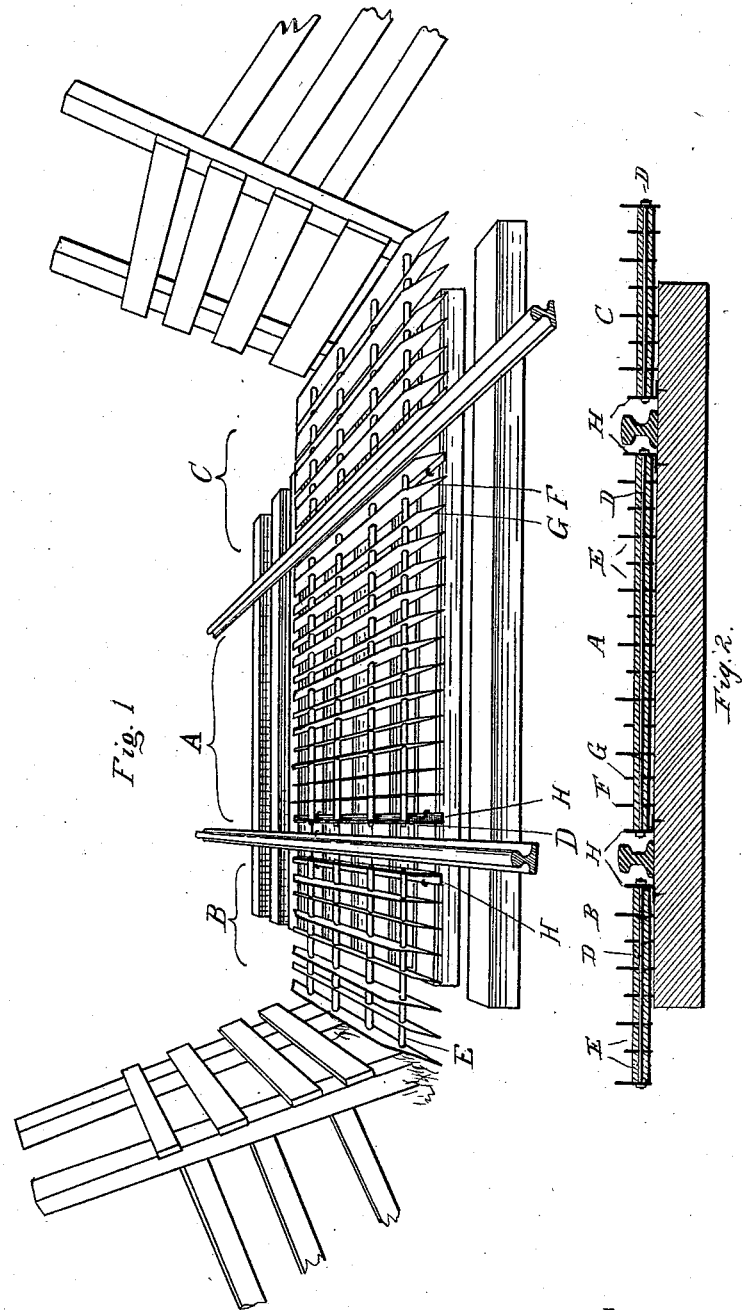

JAMES T. HALL, OF ST. LOUIS, MICHIGAN.

CATTLE-GUARD.

SPECIFICATION forming part of Letters Patent No. 379,107, dated March 6, 1888.

Application filed October 22, 1887. Serial No. 253,081. (No model.)

*To all whom it may concern:*

Be it known that I, JAMES T. HALL, a citizen of the United States, residing at St. Louis, in the county of Gratiot and State of Michigan, have invented certain new and useful Improvements in Cattle Guards, of which the following is a specification, reference being had therein to the accompanying drawings.

This invention relates to certain new and useful improvements in railway cattle-guards, the well-known object of which is to guard the railway-tracks at a road-crossing against stock straying onto the track. At the present state of the art surface obstructions are placed at such points upon the track which are especially designed to destroy the footing for animals, and among different devices employed for that purpose gratings formed of iron strips have been used. It is to this kind of cattle-guards my improvement has special reference; and it consists in the novel construction and arrangement of the parts, all as more fully hereinafter described.

In the drawings which accompany this specification, Figure 1 is a perspective view of a cattle-guard embodying my improvements. Fig. 2 is a vertical cross-section.

A, B, and C are three sections of grating, one section being placed between the track-rails and the other two at the outside thereof. Each section is formed of a series of metal strips, preferably band-iron, set up on edge parallel with the track and secured together by means of transverse bolts D and spacing-thimbles E, sleeved upon these bolts between the strips. Instead of having the upper edges of all the strips on the same plane, as heretofore, I arrange them alternately upon different planes, for the purpose of destroying the footing more effectually. This object may be obtained by setting up the strips alternately higher and lower; but I prefer to use strips of different widths.

In the drawings, F represents the higher and G the lower strips, the former being about the height of the rails, while the latter are, say, one inch lower, more or less. By spacing the strips about three and one-half inches apart, it will be seen that all the footing an animal could find would be the edge of one strip only, provided the difference in height between two adjacent strips is sufficient to prevent an animal from placing its foot in an inclined position on both. By making this difference one inch this object is fully obtained, and a cattle-guard thus constructed absolutely destroys the footing for cattle and horses, and thereby forms a most efficient device for the purpose designed. When the upper edges of all the strips are on the same plane, the animal is afforded a footing upon the edges of two strips, as it is not permissible to space the strips farther apart, on account of the great danger which would exist of cattle getting caught between two strips.

What I claim as my invention is—

1. A cattle-guard composed of strips of iron set up on edge, with the upper edges of the alternate strips upon different planes, substantially as described.

2. A cattle-guard composed of strips of iron of unequal width alternately set up on edge in the form of a grating, substantially as described.

3. In a cattle-guard consisting of a series of iron strips set up on edge, the combination of the iron strips G F, of different width, the angle-bars H, the transverse bolts D, and the thimbles E, all arranged to operate substantially as described.

In testimony whereof I affix my signature, in presence of two witnesses, this 6th day of October, 1887.

JAMES T. HALL.

Witnesses:
H. S. SPRAGUE,
R. S. MALLORY.